United States Patent [19]

Bennett

[11] Patent Number: 4,529,864
[45] Date of Patent: Jul. 16, 1985

[54] CLOSED LOOP CONTROL APPARATUS FOR SHORT-CIRCUIT ARC WELDING

[76] Inventor: Dale E. Bennett, 801 N. Mtn. View Pl., Fullerton, Calif. 92631

[21] Appl. No.: 497,086

[22] Filed: May 23, 1983

[51] Int. Cl.³ .............................................. B23K 9/12
[52] U.S. Cl. ......................... 219/137.71; 219/137 PS
[58] Field of Search ..................... 219/137.71, 130.21, 219/137 PS

[56] References Cited

U.S. PATENT DOCUMENTS 3,627,975 12/1971 Goto ................................ 219/137.71
3,731,049 5/1973 Kiyohara et al. ............... 219/137.71
4,000,374 12/1976 DeKeyser ...................... 219/137.71

Primary Examiner—Clifford C. Shaw
Attorney, Agent, or Firm—Dale E. Bennett

[57] ABSTRACT

This invention is a closed loop control system for controlling the speed at which a consumable electrode is advanced toward a workpiece, for short-circuit metal transfer arc welders. Proportional plus integral feedback is provided for controlling the electrode feed motor speed to reduce the error between commanded and measured time periods between successive weld short-circuit onsets. Speed controls for both direct current and alternating current electrode feed motors are included.

6 Claims, 3 Drawing Figures

CLOSED LOOP CONTROL APPARATUS FOR SHORT-CIRCUIT ARC WELDING

BACKGROUND OF THE INVENTION

1. Field of Invention

This is a control system invention which applies speed control to consumable electrode feed devices for use with electric short-circuit metal transfer arc welders.

2. Description of Prior Art

The present invention applies to weld electrode feed motor speed control. One prior art method in this field (U.S. Pat. No. 3,731,049) adjusts the weld electrode feed motor speed as a function of the ratio between the arc-on period and the total period between short-circuits. Another prior art method in this field (U.S. Pat. No. 3,627,975) adjusts the weld electrode feed motor speed as a function of the arc-on period. Both of these prior art methods require an accurate measure of the arc-on period, therefore requiring a predefined weld power source voltage waveform in order to make possible arc-on period sensing. The present invention senses only the immediate voltage drops coincident with the weld short-circuit onsets thus eliminating the requirement for a predefined weld power source voltage waveform. In addition the present invention incorporates external controls for adjusting the weld electrode feed motor speed to accomodate varying welding conditions, which neither of the prior art methods provide. Finally the present invention provides both proportional and integral type controls; the integral control for reducing steady state erroes between the desired and measured time periods between weld short-circuit onsets. Neither of the two prior art methods provide integral type control.

SUMMARY OF THE INVENTION

The present invention is a closed loop control system for controlling the speed at which the electrode is advanced toward the workpiece in a short-circuit metal transfer arc welder apparatus. The control signals are derived by computing the differences between commanded and measured time periods between short-circuit onsets (or time periods directly related to the time periods between short-circuit onsets). The short-circuit onsets are sensed by a detector circuit which senses the drop in voltage at the instant that the weld short-circuit onset occurs.

The present invention also provides manual selection controls for manually setting the desired (command) time period between weld short-circuit onsets. The present invention provides proportional, and integral feedback control signals, and filter shaping for dynamics control. The present invention applies to both alternating current (ac) and direct current (dc) motors, and to dc, constant voltage welding electric power sources.

BRIEF DESCRIPTION OF THE DRAWING

The drawings in FIG. 1 include logic gate signal timing diagrams, and a representation of the electrical ac power input voltage waveform. The logic gate signals are used for causing the speed control of the electrode drive motor to be in synch with the electrical ac power input by switching off the electrical ac power to the electrode drive motor each time the ac voltage reverses polarity, and then at some time later in the cycle, as determined by the speed control circuitry, switching the ac power back on again. The motor speed will increase if the ac power is switched back on earlier and conversely the motor speed will decrease if the ac power is switched back on later in the cycle.

The drawings in FIG. 2 include logic gate signal timing diagrams and a representation of a typical voltage waveform of the welder electrical power output during a normal welding operation characterized by a series of weld short-circuit periods and arcing periods. The logic gate signals operate to control the generation of the error signal (differencing quantity) between the command time (commanding quantity) and the measured time (measuring quantity) between weld short-circuit onsets. The differencing quantity is then converted to a controlling quantity which is used for controlling the electrode drive motor to obtain the correct motor speed.

The drawing in FIG. 3 is a functional block diagram of a distal circuit representation of the preferred embodiment of the present invention. The present invention is a closed loop control system for controlling the speed at which an electrode is advanced toward a workpiece, FIG. 3 also shows the interconnecting of the logic and clock signals to the individual elements. The control and interface circuitry for developing the error signal and for providing proportional and integral gain control is contained in several elements.

FIG. 3 shows two motor and controller elements, one of which contains a method for dc motor control and the other a method for ac motor control. The mechanical coupling of the motor to the electrode feed rollers and the electrical power connections to the electrode and weld workpiece are shown.

DESCRIPTION OF THE PREFERRED EMBODIMENT

The present invention is a closed loop control system for automatically controlling the speed at which an arc welding electrode is advanced toward the workpiece. The present invention applies to short-circuit metal transfer arc welders which use constant voltage, dc, power sources. An objective of the present invention is the provision of a new and improved closed loop control apparatus for automatically adjusting the electrode feed motor speed to accomodate varying weld environments such as when the welding power source voltage setting is changed or when the relative position of the electrode tip and the workpiece is changed because of unsteady motion control of the electrode gun. Another objective of the present invention is the provision of a proportional plus integral control method to minimize error buildup between the commanded and measured periods between weld short-circuit onsets (or periods directly related to the periods between weld short-circuit onsets). Another objective of the present invention is the provision of initializtion circuitry for delaying the initiation of closed loop control unitl the speed of the electrode feed motor is adequate, and provision of initialization circuitry for initializing the controls to reduce the error excursion during the beginning phases of the welding process. The mechanization of the present invention can take on various forms depending on if it is built using analog circuits, or digital circuits, or a combination of both. Also the elements of the present invention can differ depending on the choice of electronic components to be used. Moreover, the elements can change depending on whether an ac or dc motor is to be used.

Figure 3:
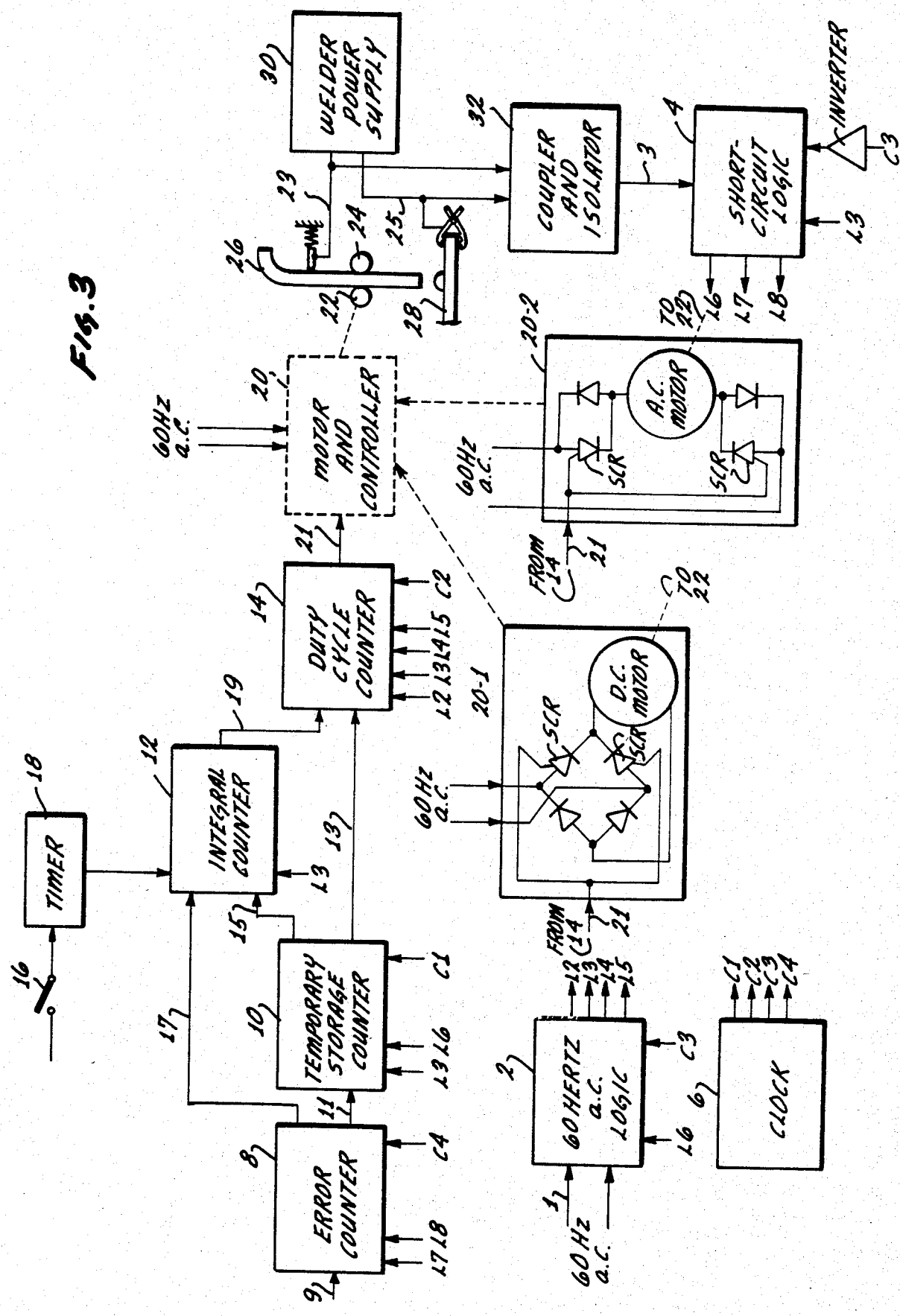
FIG. 3 shows the functional elements that are used and how they are connected for providing the closed loop control. Among the functional elements there are two logic blocks and a clock timing block for controlling and supporting the gating and timing of the control operations.

A functional block diagram of the preferred embodiment is shown in FIG. 3; a detailed description is given in the following. The preferred embodiment comprises several interconnecting electronic and electromechanical elements in addition to a clock timing element, and two independent logic elements which derive logic signals for controlling the phasing of the electronic actions during the welding process. One of of the logic elements is for synchronizing the electrode feed motor speed control to the 60 Hertz ac power input 1. This is named the 60 Hertz as logic element 2. The other logic element is for controlling the development of the error signal (differencing quantity) that is used for controlling the speed of the electrode feed motor. This logic element uses the welding short-circuit signal voltage 3 for sensing the weld short-circuit onsets 5, and is named the short-circuit logic element 4.

Figure 1:
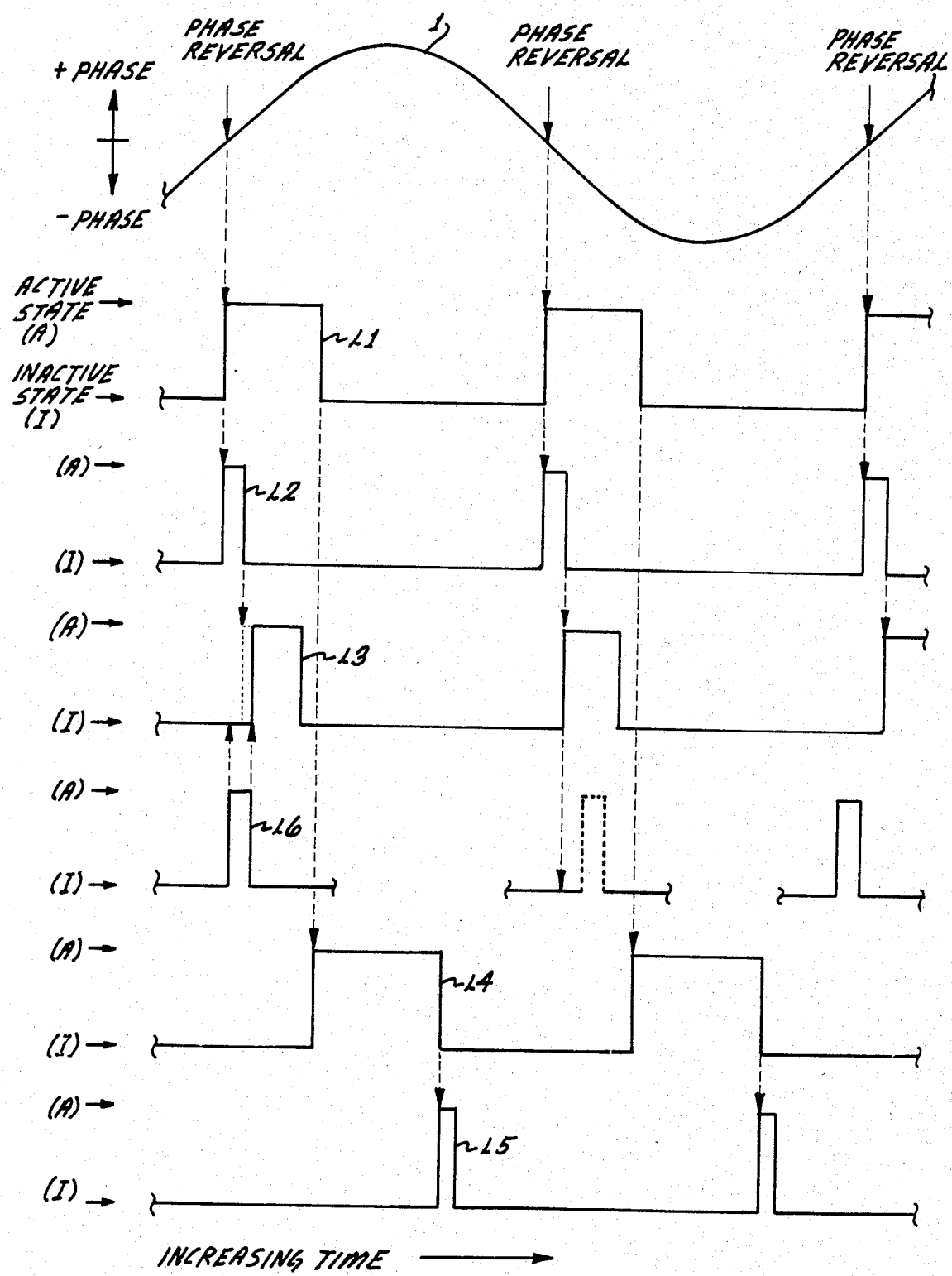

The 60 Hertz ac logic element 2 produces five logic gate signals; the timing of these five logic gate signals is shown in FIG. 1. The first of these logic gate signals is the 60 Hertz phase reversal gate signal L1, which becomes active each time the 60 Hertz ac input reverses polarity, and it becomes inactive approximately 2 milliseconds later. The second logic gate is the integrator output transfer gate L2, which enables the parallel transfer of the integrator output to the duty cycle counter. Logic gate L2 is activated at the time, or shortly after the time that logic gate L1 is activated, in synchronism with the active state transition of clock signal C3. The time period of logic gate L2 is equal to one clock period of signal C3. The third logic gate is the forward loop transfer gate L3, which is for enabling the simultaneous serial transfer of the temporary storage counter output to both the integral counter and the duty cycle counter. The logic gate L3, except for special circumstances which are described later, is activated following the deactivation of gate L2, in synchronism with the active state transition of clock signal C3, and is deactivated upon completion of the serial transfer. The fourth logic gate is the duty cycle counter gate L4, which is for enabling the duty cycle counter to perform a count down to zero. Logic gate L4 becomes active upon deactivation of logic gate L1, in synchronism with the active state transition of the clock signal C3, and is deactivated when the duty cycle count reaches zero. The fifth logic gate is the SCR activate gate L5, which is for enabling the switching on of the silicon control rectifier to it conductive state. The SCR activate gate L5 becomes active at the time that the duty cycle counter count reaches zero, and becomes inactive approximately 0.2 milliseconds later.

Figure 2:
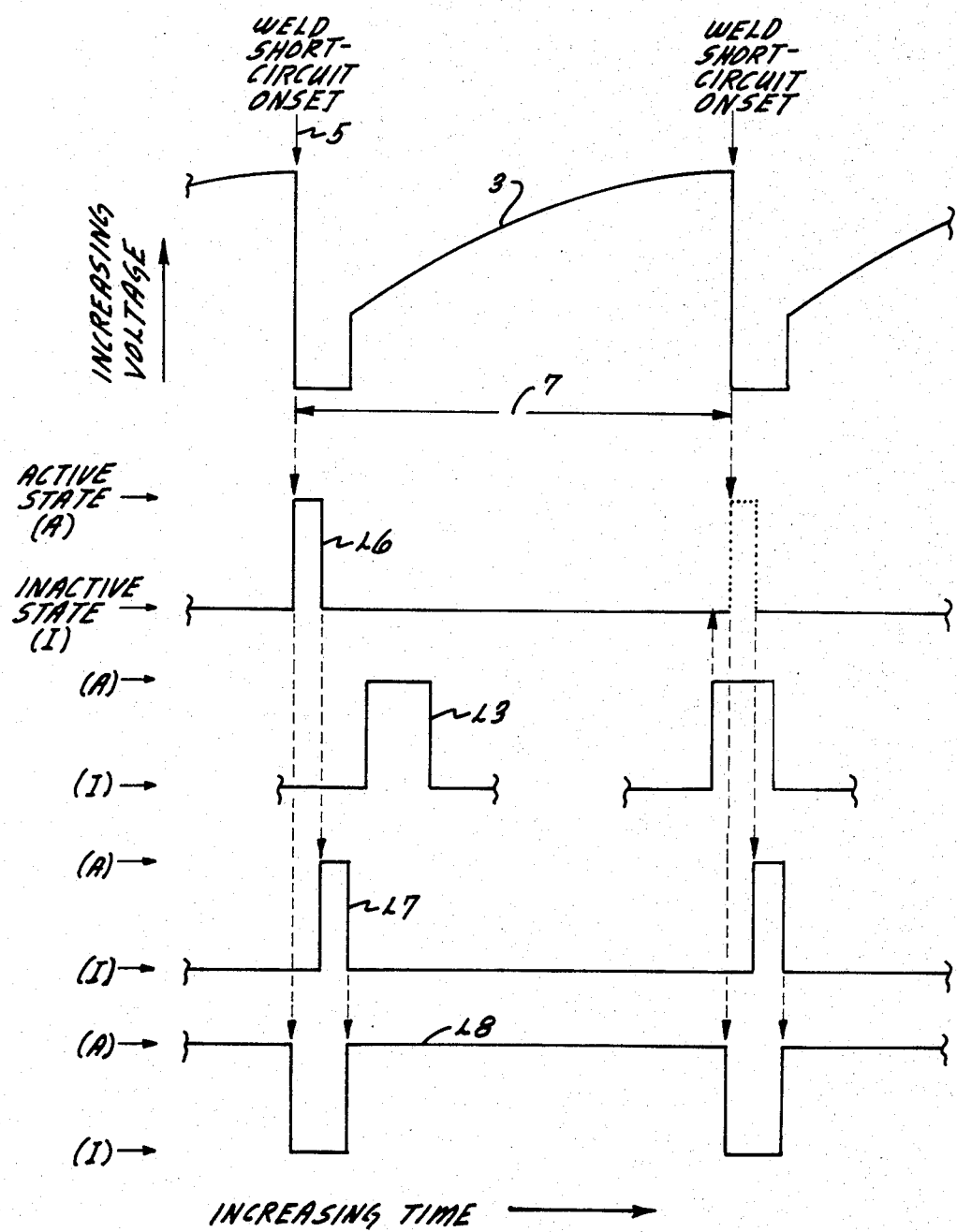

The short circuit logic element 4 produces three logic gate signals for enabling error signal (differencing quantity) development; the timing of these three signals is shown in FIG. 2. The first of the three logic gate signals is the error count transfer gate L6, which is for enabling the parallel transfer of the error count from the error counter to the temporary storage counter. This logic gate L6, except for special circumstances that are explained later, is activated at the time, or shortly after the time of a weld short-circuit onset 5, in synchronism with the active state transition of the clock signal C3 (inverted). The time period of logic gate L6 is equal to one clock period of signal C3 (inverted). The second logic gate signal is the command transfer logic gate L7, which enables the parallel transfer of the weld short circuit onset command period (commanding quantity) to the error counter. Logic gate L7 is activated upon the deactivation of logic gate L6 even though logic gate L6 may be disabled from controlling the error count transfer (see FIG. 2). The time period of logic gate L7 is equal to one clock period of signal C3 (inverted). The third logic gate signal is the error count gate L8, which enables the error counter to count the active state transitions of the input clock signal C4. The count time is directly related to the time between successive short-circuit onsets, and for this embodiment the count time can be less than the actual time between short-circuit onsets by up to three clock periods of signal C3. Gate signal L8 is activated upon the deactivation of gate signal L7, and is deactivated upon the activation of gate signal L6 even though gate signal L6 may be disabled from controlling the error count transfer.

The two independent logic elements, the 60 Hertz ac logic element 2, and the short-circuit logic element 4 each impose restrictions on the operation of the other. The reason for this is to avoid conflicting operations which could result in spurious motor speed control signals (controlling quantity). To accomplish this objective the forward loop transfer gate signal L3, from the 60 Hertz ac logic element, is used for disabling the error count transfer gate L6 (see FIG. 2). Also the error count transfer gate L6 is used for disabling the forward loop transfer gate L3 (see FIG. 1). The gate signal which becomes active first disables the other; if gate signal L3 becomes active first then gate signal L6 is disabled, and if gate signal L6 becomes active first then gate signal L3 is disabled. Disabling occurs when the two gates appear during the same time period. The two gate signals, L3 and L6 can not switch to the active state at the same instant of time because gate signal L3 is activated in synchronism with the active state transition of the clock signal C3 and gate signal L6 is activated in synchronism with the active state transition of the clock signal C3 (inverted).

The preferred embodiment contains a clock element 6, which comprises a clock oscillator that generates clock pulses at a frequency of approximately one megahertz, and dividing circuitry that provides, among others, the following frequencies: clock freq./2=C1; clock freq./32=C2; clock freq./64=C3; and clock freq./128=C4. This choice of frequencies is somewhat arbitrary and is based on the hardware utilization, and the timing characteristics of short-circuit metal transfer welding systems.

The error counter element 8 comprises an eight bit binary counter that is used for developing error signals (differencing quantity) which represent the differences between the commanded (commanding quantity) and measured (measuring quantity) time periods between weld short-circuit onsets. The input 9, in the preferred embodiment, is a potentiometer control for manual selection of the desired period between weld short-circuit onsets. The potentiometer output is connected to an eight bit, binary, analog to digital conveter. The analog to digital converter outputs are connected to the corresponding parallel input connections of the error counter. The loading of these binary signals into the error counter is by a parallel transfer during the active state of the command transfer gate L7.

The error signal (differencing quantity) is obtained by subtracting the measured time period between short-circuit onsets (measuring quantity) from the commanded time period between short circuit (commanding quantity) onsets. The measured time period (measuring quantity) is obtained by counting the number of times the clock pulse signal C4 switches to the active state between successive weld short-circuit onsets. The operation sequence begins with the loading of the commanded time period between weld short-circuit onsets (commanding quantity) into the error counter. This takes place during the active state of the command transfer gate L7. Next the active state transitions of the clock signal C4 are sequentially subtracting from the previously stored command. This takes place during the active state of the error count gate signal L8. The error count gate switches to the inactive state at the time that the next weld short-circuit onset signal is received. At this time the error counter contains a value that represents the error between the commanded and measured time periods between short-circuit onsets (differencing quantity). This error value is coupled to the temporary storage counter 10 by means of parallel connections represented by connection 11. This parallel transfer takes place concurrently with the active state of the error count transfer gate L6. Following this, and during the active state of the gate signal L7 the command time period (commanding quantity) is again loaded into the error counter and the process is repeated.

The temporary storage counter element 10 comprises an eight bit binary counter with parallel binary inputs denoted by connection 11. The binary inputs are loaded by a parallel transfer into the temporary storage counter during the active state of the error count transfer gate L6. Following this parallel transfer, and while transfer gate L3 is active, the temporary storage counter output is serially transferred to the integral counter and duty cycle counter. This transfer is performed by sequentially subtracting (for positive errors) or by sequentially adding (for negative errors) the active state transitions of the clock signal C1 until the temporary storage counter output reaches zero, at which time the counting is inhibited.

The temporary storage counter element output is serial in form and it provides a series of clock pulse signals to the duty cycle counter element 14. The clock pulse signals are gated into the duty cycle counter when the forward loop transfer gate L3 is active. The number of clock pulses that are input to the duty cycle counter (controlling quantity) are made proportional to the magnitude of the error signal (differencing quantity) thereby providing forward loop proportional gain control to the closed loop system. For example, if for a particular system it was chosen to use a forward loop proportional gain of 0.5 then the number of clock pulses to the duty cycle counter would be 50% of the number used for counting the temporary storage counter output to zero. In the preferred embodiment the proportional gain is obtained by coupling the duty cycle element input connection 14 to signal C1 or to one of the temporary storage counter's parallel binary output connections during the active state of logic gate signal L3. The resultant gain is dependent upon which connection is used, for example if connection 14 was connected to the least significant bit output of the temporary storage counter, the proportional gain would be 0.5. For those skilled in the art it is obvious that there are many ways of providing proportional gain control, and filter compensation for enhancing loop stability and control. The method chosen for the preferred embodiment was selected for its simplicity.

The integral counter element 12 comprises an eight bit binary counter with serial input connection 15 and parallel input connections denoted as connection 17. The serial connection 15 is for transferring the error signal (differencing quantity) to the integral counter, and the parallel connections 17 are for transferring initialization signals to the integral counter. The initialization signals for the preferred embodiment are the binary short-circuit onset time period command signals (controlling quantity). The initialization takes place during motor rev-up when the motor is accelerating to its normal running speed. The rev-up period is set by timer 18 which is activated by the weld electrode gun switch 16. The initialization process is terminated by timer 18 at the end of the preset rev-up time period. Initialization is not performed again until the weld electrode gun switch is first released and then reactivated. The serial input 15 is for transferring a series of pulses from the storage counter output to the integral counter. The pulses are gated into the integral counter when the forward loop transfer logic gate L3 is active. The number of pulses that are input to the integral counter are made proportional to the magnitude of the error signal in such a way as to provide a specific gain to the integral signal path. For example, to provide an integral gain of $\frac{1}{8}$, connection 15 should be connected to the third lowest bit output of the temporary storage counter. The duty cycle element 14 comprises an eight bit binary counter, and an output pulse forming network. The input connection 13 is for the serial transfer of the proportional error signal (controlling quantity) to the duty cycle counter. The parallel input connections, denoted by connection 19, are for the parallel transfer of the integral (binary) output signals to the duty cycle counter. The first of the two transfers to the duty cycle counter is the parallel transfer of the integral counter output during the active state of integral output transfer gate L2. The second transfer to the duty cycle counter is the serial transfer of the proportional error signal (controlling quantity) during the active state of the forward loop transfer gate L3. When this second transfer is complete the duty cycle counter contains the combined sum of the proportional error signal (controlling quantity) and the integrator output signal (additive component of controlling quantity). Next, by enabling the inputting of clock signal C2 during the active state of duty cycle counter logic gate L4, the duty cycle counter is counted down to zero. When the duty cycle count reaches zero a pulse forming network is activated which generates the SCR activate gate flag L5, which is for activating the SCR power control to the electrode feed motor. If the error signal indicates that the motor speed is to high, the SCR activate gate flag L5 will appear later in time so that the time period during which power is applied to the motor is reduced. Conversely, if the error signal indicates that the motor speed is low then the SCR activate gate flag will appear earlier in time. If the error signal is zero, the integrator output will remain constant and the SCR activate gate will appear at the same time as before.

The motor and controller element 20 comprises a controller apparatus and an electric motor with a drive mechanism for coupling to the electrode feed rollers 22 and 24. The motor and controller element 20 is defined as motor and controller element 20-1 for dc motors and motor and controller element 20-2 for ac motors. The dc motor and controller element 20-1 comprises a diode and SCR bridge arrangement as shown in FIG. 3. In this arrangement the SCR control inputs are connected by connection 21 to the duty cycle counter element output, and both SCRs are pulsed by the SCR activate gate L5, but only one of the two SCRs is gated on to the conductive state. The SCR with its anode connected to the positive phase side of the 60 Hertz ac input will be switched on to it's conductive state by the SCR activate gate L5 and that SCR will remain on until it it is deactivated at the next 60 Hertz phase reversal. The other SCR will be switched on to it's conductive state by the next SCR activate gate L5, when the 60 Hertz act input polarity is positive relative to that SCR's anode connection. This SCR will conduct current flow until the 60 Hertz ac input again reverses polarity. This process is then repeated with the other SCR. The ac motor and controller element 20-2 comprises an SCR and diode arrangement shown in FIG. 3. Both SCRs are pulsed by the SCR activate gate L5, but only one of the two SCRs is turned on to the conductive state in the same manner as described regarding the dc motor and controller element 20-1. The major difference being that the current flow is in both directions for the ac motor controller and in one direction only for the dc motor controller.

The motor is mechanically coupled to the electrode feed rollers 22 and 24 which, when rotated, cause the electrode 26 to advance toward the workpiece 28.

The welder power supply element 30 provides a direct current constant voltage power output for facilitating short-circuit metal transfer arc welding. The power output connection 23 is held in physical contact with the electrode 26. The opposite polarity output is connected to workpiece 28 by the connection 25.

The electrical connections 23 and 25 are connected to the coupler and isolator element 32. The coupler and isolator element comprises an electro optical coupler and isolator for coupling the weld short-circuit signal 3 to the short circuit logic element 4, and for isolating the welder electrical power from the control circuitry electrical power. The short-circuit logic element 4 comprises a detector circuit which senses the weld short-circuit onset 5, and initiates logic action which ultimately provides the closed loop feedback control as previously described.

The preferred embodiment description contains several references to 60 Hertz power input, however other frequencies such as 50 Hertz are equally applicable.

What is claimed is:

1. An electrode feed control system for regulating the speed at which consumable electrode is fed in a short-circuit metal transfer arc welding apparatus, for applying welds to base metal comprising:
  (a) An input command device comprising means for setting, and producing a commanding quantity indicative of time periods equal to, or directly related to time periods between successive weld short-circuit onsets;
  (b) A sensing device comprising means for sensing weld short-circuit onsets;
  (c) A measuring device comprising means for measuring, and producing a measuring quantity indicative of time periods equal to, or directly related to, time periods between successive weld short-circuit onsets;
  (d) A differencing device comprising means for producing a differencing quantity indicative of the differences between said commanding quantity and said measuring quantity;
  (e) A forward path control device comprising means for producing a controlling quantity indicative of proportional gain applied to said differencing quantity;
  (f) An electric motor device comprising means for coupling motor shaft with electrode feed mechanism;
  (g) A motor speed control device comprising means for controlling motor speed in response to said controlling quantity; and
  (h) A welder power source device comprising means for providing direct current, constant voltage electrical power and means for connecting electrical power to workpiece and moveable electrode for facilitating short-circuit metal transfer arc welding.

2. An electrode feed control system according to claim 1, wherein said forward path control device further comprises means for producing said controlling quantity with an additional additive component indicative of the time integral of said differencing quantity.

3. An electrode feed control system according to claim 1, wherein said forward path control device further comprises means for initializing commands to the electrode feed motor motor speed control.

4. An electrode feed control system according to claim 1, wherein said forward path control device further comprises means for delaying speed control action until adequate electrode feed motor speed is reached.

5. An electrode feed control system accordjng to claim 1, wherein said motor speed control device further comprises means for applying alternating current power for direct current motor speed control.

6. An electrode feed control system according to claim 1, wherein said motor speed control device further comprises means for applying alternating current power for alternating current motor speed control.

* * * * *